(12) United States Patent
Ruan et al.

(10) Patent No.: US 12,663,185 B2
(45) Date of Patent: Jun. 23, 2026

(54) DEVICES AND METHODS FOR CONCENTRATED RADIATIVE COOLING

(71) Applicant: Purdue Research Foundation, West Lafayette, IN (US)

(72) Inventors: Xiulin Ruan, West Lafayette, IN (US); Joseph Arthur Peoples, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 17/703,113

(22) Filed: Mar. 24, 2022

(65) Prior Publication Data

US 2022/0307730 A1     Sep. 29, 2022

Related U.S. Application Data

(60) Provisional application No. 63/165,261, filed on Mar. 24, 2021.

(51) Int. Cl.
*F24S 23/74*        (2018.01)
*F24F 5/00*         (2006.01)
(Continued)

(52) U.S. Cl.
CPC ............ *F24S 23/74* (2018.05); *F24F 5/0046* (2013.01); *F24S 10/748* (2018.05); *F24S 20/25* (2018.05); *F24S 23/82* (2018.05); *F24S 40/55* (2018.05); *F24F 2005/0064* (2013.01); *F24S 2023/86* (2018.05)

(58) Field of Classification Search
CPC .............................. F25B 23/003; Y10S 62/01
See application file for complete search history.

(56) References Cited

U.S. PATENT DOCUMENTS 3,310,102 A  *  3/1967  Trombe ................ F24F 5/0007
                                                    165/133
3,923,039 A  *  12/1975  Falbel ..................... F24S 25/13
                                                    126/633
(Continued)

FOREIGN PATENT DOCUMENTS

WO        WO-9506330 A1  *  3/1995  .............. F24S 23/70
WO    WO-2020072818 A1  *  4/2020  ............... B05D 1/28

*Primary Examiner* — Michael G Hoang
*Assistant Examiner* — Deepak A Deean
(74) *Attorney, Agent, or Firm* — Hartman Global IP Law; Gary M. Hartman; Domenica N.S. Hartman

(57)        ABSTRACT
Devices and methods for concentrated radiative cooling using radiative cooling coatings in combination with mid-infrared reflectors. Concentrated radiative cooling (CRC) devices include an object to be cooled that is coated with a radiative cooling material and a mid-infrared (mid-IR) reflector configured to reflect thermal energy radiated from a surface of the object to deep space. The object may be nested in a mid-IR reflective trough such that substantially an entirety of the object's surface area contributes to radiative cooling. The radiative cooling material may be a coating such as a paint or film that is applied directly to the object's exterior surfaces to reduce thermal resistances. The radiative cooling coating is configured to lose thermal energy from the object by means of exhibiting high emissivity for wavelengths of 8 to 13 micrometers, and in some arrangements of 5 to 30 micrometers.

10 Claims, 9 Drawing Sheets

(51) Int. Cl.
  F24S 10/70            (2018.01)
  F24S 20/25            (2018.01)
  F24S 23/70            (2018.01)
  F24S 40/55            (2018.01)

(56)                 References Cited

U.S. PATENT DOCUMENTS

| 4,030,316 A | * | 6/1977 | Aronson | G01J 5/061 |
| | | | | 62/467 |
| 4,594,995 A | * | 6/1986 | Garrison | F24S 70/225 |
| | | | | 126/569 |
| 4,624,113 A | * | 11/1986 | Hull | F25B 23/003 |
| | | | | 62/235.1 |
| 5,086,828 A | * | 2/1992 | Ewert | B64G 1/50 |
| | | | | 136/246 |
| 9,383,120 B1 | * | 7/2016 | Winston | B21D 53/02 |
| 9,393,120 B2 | * | 7/2016 | Strippgen | A61B 17/7055 |
| 9,523,516 B2 | * | 12/2016 | Hebrink | F03G 6/061 |
| 2009/0090488 A1 | * | 4/2009 | McCann | F24F 5/0046 |
| | | | | 165/104.31 |
| 2014/0020678 A1 | * | 1/2014 | Krothapalli | F24S 30/20 |
| | | | | 126/714 |
| 2015/0131146 A1 | * | 5/2015 | Fan | G02B 5/208 |
| | | | | 359/350 |
| 2015/0338175 A1 | * | 11/2015 | Raman | F24F 5/0092 |
| | | | | 165/185 |
| 2018/0244928 A1 | * | 8/2018 | Van Overmeere | C09D 5/004 |
| 2023/0020511 A1 | * | 1/2023 | Hsu | F28F 13/18 |
| 2023/0213243 A1 | * | 7/2023 | Hebrink | F24S 21/00 |
| | | | | 126/680 |
| 2023/0221083 A1 | * | 7/2023 | Balma | F28F 3/04 |
| | | | | 165/185 |
| 2024/0142116 A1 | * | 5/2024 | Varghese | F25B 13/00 |
| 2024/0418418 A1 | * | 12/2024 | Lu | F25B 25/00 |

* cited by examiner

DEVICES AND METHODS FOR CONCENTRATED RADIATIVE COOLING

CROSS-REFERENCE TO RELATED APPLICATIONS

This application claims the benefit of U.S. Provisional Application No. 63/165,261 filed Mar. 24, 2021, the contents of which are incorporated herein by reference.

BACKGROUND OF THE INVENTION

The present invention generally relates to devices and methods for dissipating thermal energy. The invention particularly relates to devices and methods that use radiative cooling coatings in combination with mid-infrared reflectors to promote passive radiative cooling of objects.

Cooling objects subjected to direct sunlight is a challenging but essential need for buildings, automobiles, and equipment. Air conditioning is a widely-used active cooling method, but consumes large amounts of electrical power. In addition, active cooling is not possible or practical for certain equipment, leading to overheating problems and deteriorated performance. Passive radiative cooling techniques have been proposed that utilize high emission through a "sky window" to transmit thermal energy to the deep sky without relying on electrical power. As known in the art and as used herein, the term "sky window" refers to a transparent spectral window of the atmosphere, ranging from 8 micrometers to about 13 micrometers, where emitted heat can be transmitted directly from a surface on the Earth, through the Earth's atmosphere, to the deep space, which acts as a 3 K heat sink.

In 2018, 9.3 percent of the total generated electricity in the United States went to space cooling and refrigeration of commercial buildings, equating to 164.7 million metric tons of carbon dioxide emission, just for commercial cooling. Radiative cooling is a sustainable, passive cooling approach that can help lessen the economic and environmental burden of cooling in the commercial sector. With recent advances of radiative cooling materials, research is now moving toward active cooling device integration into conventional cooling systems, as well as passive cooling hybridization in building roofing. For example, previous attempts to improve radiative cooling include utilizing a planar radiative cooling surface bonded to a cold-plate system. While these attempts showed potential, they are believed to be limited at least in part due to thermal contact resistances and thermal spreading resistances. As such, it can be appreciated that it would be desirable if systems and methods were available that were capable of providing improved radiative cooling relative to existing passive cooling techniques.

BRIEF DESCRIPTION OF THE INVENTION

The present invention provides devices and methods suitable for providing improved radiative cooling relative to existing passive cooling techniques by using radiative cooling coatings in combination with mid-infrared reflectors.

According to one aspect of the invention, a device is provided that includes an object having exterior surfaces configured to be exposed to sunlight, a radiative cooling coating on the exterior surfaces of the object, and a reflector. The radiative cooling coating is configured to lose thermal energy from the object by means of exhibiting high emissivity for wavelengths of 8 to 13 micrometers, and in some arrangements of 5 to 30 micrometers. The radiative cooling coating is configured to radiate the thermal energy from a first of the exterior surfaces in first directions and a second of the exterior surfaces in second directions that are different from the first directions. The reflector has a surface configured to reflect the thermal energy radiated from the radiative cooling coating on the second surface and redirect the thermal energy in the first directions.

According to another aspect of the invention, a method is provided for modifying a cooling system that includes an object having exterior surfaces configured to be exposed to sunlight. The method includes applying a radiative cooling coating on the exterior surfaces of the object. The radiative cooling coating configured to lose thermal energy from the object while exhibiting high emissivity for wavelengths of 8 to 13 micrometers. The method includes installing a reflector adjacent the object such that a surface of the reflector reflects at least some of the thermal energy radiated from the exterior surfaces and redirects the thermal energy skyward toward deep space.

According to yet another aspect of the invention, a device is provided that includes an object having first and second exterior surfaces wherein the first exterior surface is configured to be exposed to sunlight, a radiative cooling coating on the second exterior surface of the object, and a reflector. The radiative cooling coating configured to lose thermal energy from the object by means of exhibiting high emissivity for wavelengths of 8 to 13 micrometers. The radiative cooling coating on the second exterior surface is configured to radiate the thermal energy in first directions. The reflector has a surface configured to reflect the thermal energy radiated from the second exterior surface and redirect the thermal energy in second directions that are different from the first directions.

According to yet another aspect of the invention, a method is provided for modifying a solar panel system having planar solar cells with first and second sides wherein the first side of each of the solar cells is configured to be exposed to sunlight. The method includes applying a radiative cooling coating on the second side of each of the solar cells. The radiative cooling coating is configured to lose thermal energy from the respective solar cell while exhibiting high emissivity for wavelengths of 8 to 13 micrometers. The method includes installing reflectors adjacent the solar cells such that surfaces of the reflectors reflect at least some of the thermal energy radiated from the radiative cooling coating and redirect the thermal energy skyward toward deep space.

Technical effects of the devices and methods described above preferably include the ability to significantly improve radiant cooling in a system by utilizing surfaces of the systems that radiate thermal energy but do not face the sky.

Other aspects and advantages of this invention will be appreciated from the following detailed description.

BRIEF DESCRIPTION OF THE DRAWINGS

FIG. 2A schematically represents working fluid pipes without (top image) and with (bottom image) a mid-infrared reflector, and corresponding two surface and three surface enclosures used to calculate the view factors and heat flux ratio. FIG. 2B represents reflectance and absorptance of a BaSO$_4$-based radiative cooling paint and an annealed aluminum for the mid-IR reflector. FIG. 2C represents view factors of the pipe and a comparison of the heat flux ratio of the pipe with the reflector to that of the pipe without the reflector.

FIG. 3A shows a pair of devices that include a coated pipe without (top image) and with (bottom image) a mid-infrared reflector. FIG. 3B represents temperature profiles of the ambient environment (black), the pipe with no reflector (red), and the pipe with the reflector (blue). FIG. 3C represents cooling power amplification factors defined as the ratio of the below ambient temperature differences between the pipes with and without the mid-IR reflector.

FIG. 4A represents a nonlimiting CRC cooling system used for the model. FIG. 4B represents electricity usage for data in Reno, NV (top graph) and Phoenix, AZ (bottom graph) for the control case, the resistive cooling system (standalone pipes), and the CRC system (pipes with reflectors) at 70% roof coverage. FIGS. 4C and 4D represent electricity savings for Reno, NV and Phoenix, AZ, respectively, as a function of roof coverage for both systems (top graphs) and amount of time the return air temperature after the radiative cooling systems was below the set-point temperature (bottom graphs).

DETAILED DESCRIPTION OF THE INVENTION

Figure 1A:
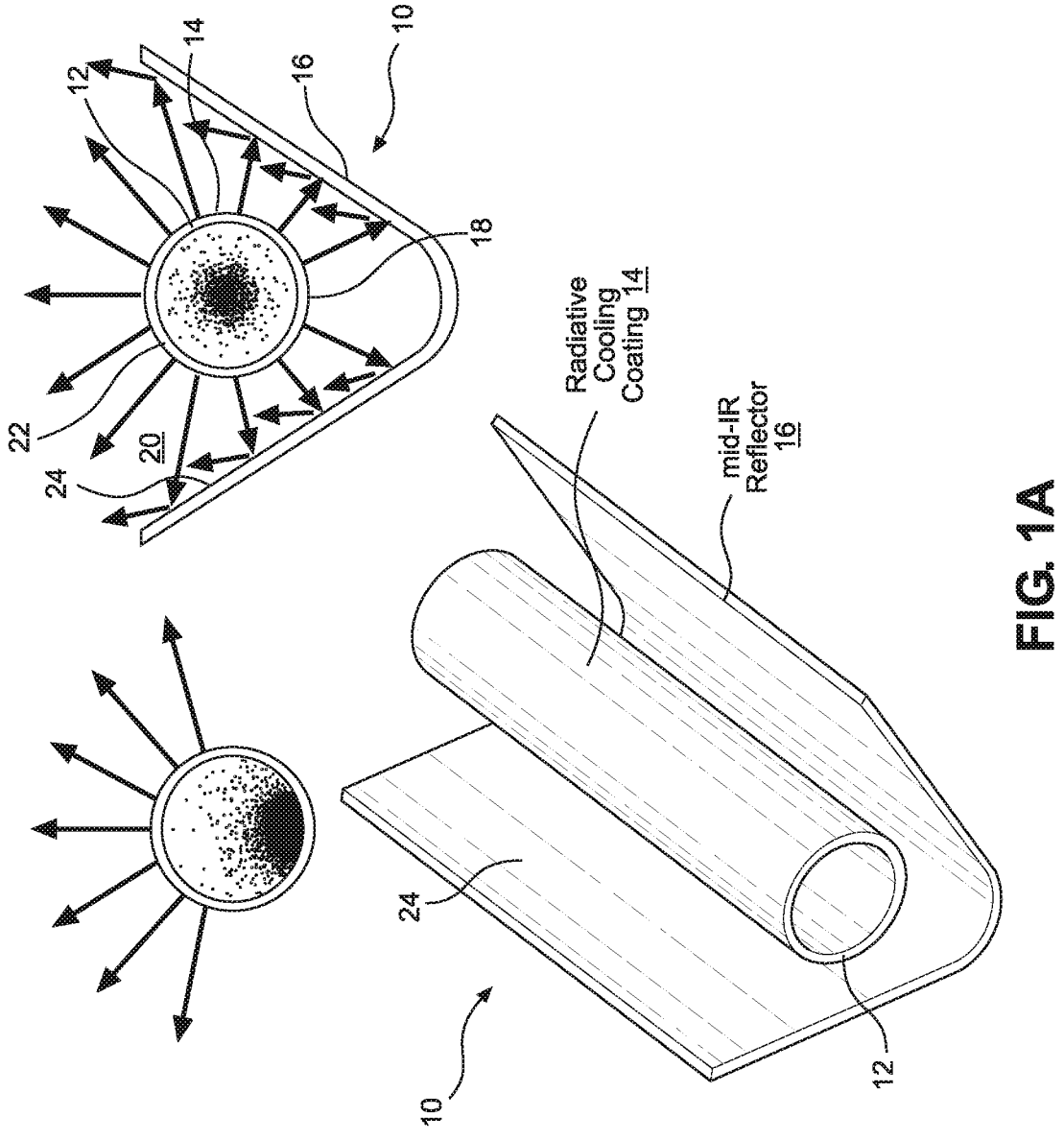
FIGS. 1A and 1B represent a concentrated radiative cooling (CRC) device and a method of integrating the CRC device into a cooling system that uses a working fluid in accordance with certain nonlimiting aspects of the invention.

The intended purpose of the following detailed description of the invention and the phraseology and terminology employed therein is to describe what is shown in the drawings, which include the depiction of one or more nonlimiting embodiments of the invention, and to describe certain but not all aspects of what is depicted in the drawings, including the embodiment(s) depicted in the drawings. The following detailed description also describes certain investigations relating to the embodiment(s) depicted in the drawings, and identifies certain but not all alternatives of the embodiment(s) depicted in the drawings. As nonlimiting examples, the invention encompasses additional or alternative embodiments in which one or more features or aspects shown and/or described as part of a particular embodiment could be eliminated, and also encompasses additional or alternative embodiments that combine two or more features or aspects shown and/or described as part of different embodiments. Therefore, the appended claims, and not the detailed description, are intended to particularly point out subject matter regarded to be aspects of the invention, including certain but not necessarily all of the aspects and alternatives described in the detailed description.

A fundamental limit of previous radiative cooling systems is that only the upper surfaces of an object facing deep space contribute to the radiative cooling effect, while the lower surfaces of the object that do not face the sky do not contribute. Devices and systems disclosed herein leverage the lower surfaces in addition to the upper surfaces to create a greater amount of surface area radiating to deep space. This approach of directing radiated thermal energy to deep space from both upper and lower surfaces of the object, simultaneously, is referred to herein as concentrated radiative cooling.

These devices, referred to hereinafter as concentrated radiative cooling (CRC) devices, include an object coated with a radiative cooling material and a mid-infrared (mid-IR) reflector configured to reflect thermal energy radiated from the lower surfaces of the object to deep space. In certain embodiments, the object is nested in a mid-IR reflective trough such that substantially an entirety of the object's surface area contributes to radiative cooling. Preferably, the radiative cooling material is a coating that is applied directly to the object's exterior surfaces to reduce thermal resistances. In embodiments wherein the radiative cooling coating is applied to all or substantially all exterior surfaces of the object, thermal insulation may not be necessary since the entire surface contributes to the passive radiative cooling effect.

The CRC devices may be used in various systems, including but not limited to systems used to cool buildings, solar cells, automobiles, and outdoor equipment whose use or operation would benefit from achieving lower surface temperatures, for example, lower utility costs attributable to air conditioning. In addition, for example, the CRC devices could be used with thermal energy storage systems and geothermal energy applications.

Figure 1B:
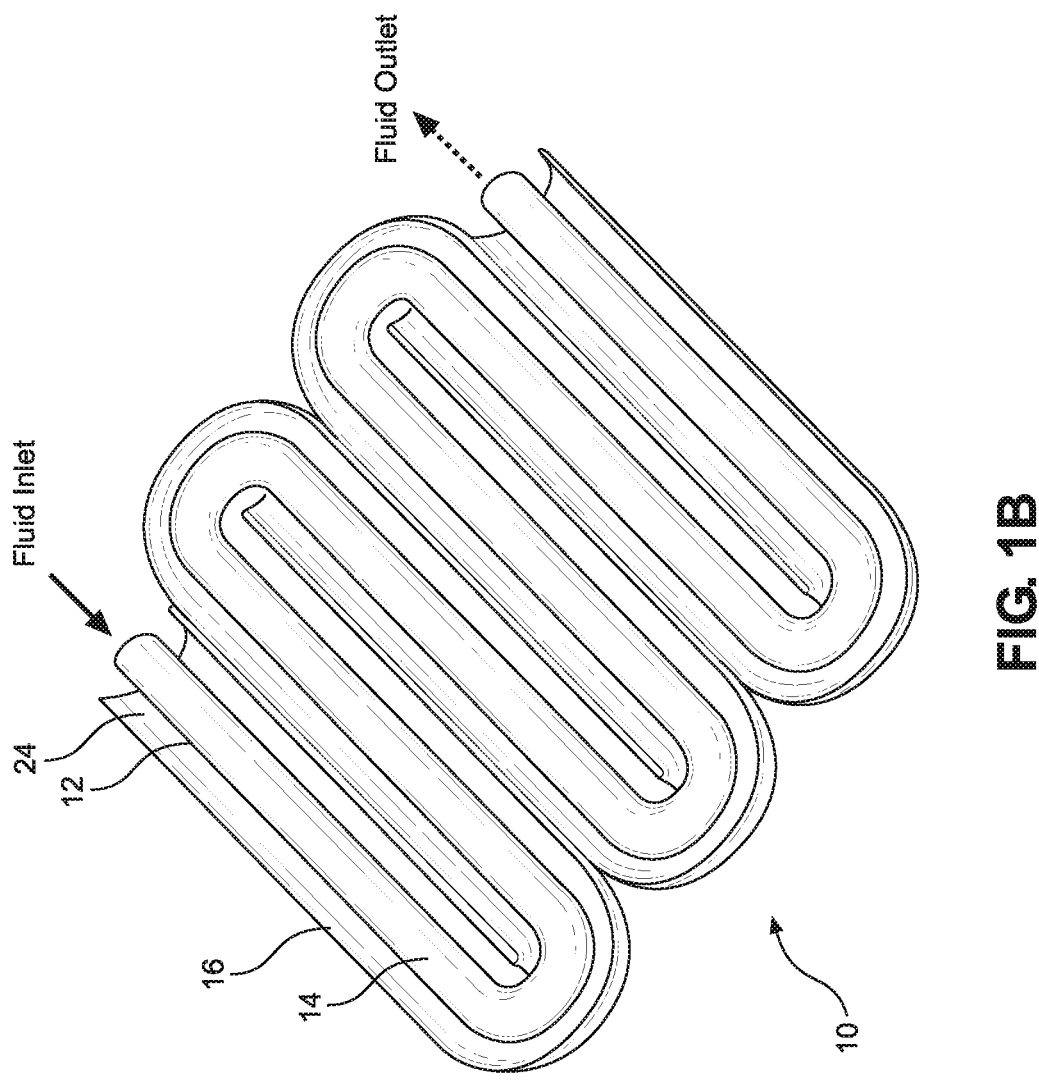

FIGS. 1A and 1B represent objects having exterior surfaces configured to be exposed to sunlight according to certain nonlimiting aspects of the invention. A nonlimiting CRC device 10 includes an elongated cylindrical pipe 12 configured to receive a working fluid therethrough for cooling a system. The pipe 12 is coated with a radiative cooling coating 14 on all or substantially all exterior surfaces thereof to promote improved radiative cooling relative to an equivalent uncoated pipe. A mid-IR reflector 16 is suspended under the pipe 12 to reflect the emitted thermal energy from lower surface(s) 18 of the pipe. The reflector 16 has a concave cross-sectional shape with an opening 20 facing the pipe 12. The pipe 12 is nested within the opening 20 of the reflector 16. The reflector 16 is elongated and follows along an elongate path of the pipe 12. In operation, the CRC device 10 would be oriented such that thermal energy radiating from the upper surface(s) 22 of the pipe 12 is directed toward the sky, and at least some of the thermal energy radiating from the lower surfaces 18 is reflected and redirected from the surfaces of the mid-IR reflector 16 toward the sky. In other words, the pipe 12 is oriented such that the upper surface 22 faces skyward toward deep space and the lower surface 18 faces away from deep space. In this manner, significant amounts of the thermal energy radiating from substantially all exterior surfaces (e.g., 360 degrees) of the pipe 12 are directed to deep space. As used herein, the term "pipe" is not limited to cylindrical cross-sectional forms, but could include other shapes, such as a square channel or other cross-sectional shapes.

The radiative cooling coatings 14 may include various materials and compositions that are capable of reducing the temperatures of objects below ambient temperatures, preferably during nighttime (between sunset and sunrise), and during part or full daytime (between sunrise and sunset) when such objects are subjected to direct sunlight. The radiative cooling coatings 14 are preferably solar-reflective infrared-emissive coatings that exhibit high emissivity for wavelengths of about 8 to about 13 micrometers and that strongly reflect sunlight (e.g., solar spectrum wavelengths of 0.3 to 3 micrometers). Nonlimiting examples include solar-reflective infrared-emissive paints disclosed in PCT Patent Application No. PCT/US2019/054566 filed on Oct. 3, 2019, and published on Apr. 9, 2020, as WO2020072818A1 (referred to hereinafter as Ruan et al.), the contents of which are incorporated herein by reference in their entirety. The solar-reflective infrared-emissive paints are suitable for reducing the temperatures of objects (such as the pipe 12) below ambient temperatures between sunset and sunrise (nighttime) and part or full daytime (between sunrise and sunset) when such objects are subjected to direct sunlight. Such a solar-reflective infrared-emissive paint may include a particle-polymer composite containing particles in a polymeric matrix, in which the particles are nanoparticles or microparticles, the paint does not contain a metallic component, and the paint exhibits high reflectance for the solar spectrum wavelengths of 0.3 to 3 micrometers and high emissivity for wavelengths of 8 to 13 micrometers.

One non-limiting example, such a solar-reflective infrared emissive paint used for the coating 14 is a metal-free composition for solar-reflective infrared-emissive coating (also referred to as a "paint"), such as the BaSO4 nanoparticle-containing acrylic composite paint described in WO2020072818A1 (the "BaSO4 paint" or "BaSO4 composite paint"). The BaSO4 paint is a composite paint consisting essentially of BaSO4 nanoparticles in an acrylic matrix. The BaSO4 composite paint contains 60% volume percent of 500 nm BaSO4 nanoparticles in the acrylic matrix. The BaSO4 composite paint has a high sky window emissivity (0.95) as well as a very high solar reflectance (98.1%). It is believed that the high solar reflectance was contributed by low solar absorptance of BaSO4 and high filler concentration to ensure high scattering within the paint. Another possible radiative cooling coating 14 is a coating formed entirely by a single layer or film of BaSO4 nanoparticles (a "BaSO4 film"). The BaSO4 film is formed by applying a mixture of 500 nm BaSO4 nanoparticles, deionized water, and ethanol as a coating on a glass substrate and allowing the mixture to fully dry to form a resulting BaSO4 film (without a polymer matrix material) having a thickness of about 150 micrometers and having a solar reflectance of 97% and an emissivity of 0.93 in the sky window. Similar coatings with different compositions that also exhibit high solar reflectance and high emissivity in the sky window may be used, such as coatings in which the particles are formed of CaC03, ZnS, SiO2, Al2O3, MgO, YAlO3, CaO, MgAl2O4, and/or LaAlO3. However, the invention is not limited to these particular coatings, and other radiative cooling coatings exhibiting similar reflectance and/or emissivity properties may be used Although the mid-IR reflector 16 is described herein primarily as a metallic, trough-shaped body having a v-shape with a rounded valley, the reflector 16 may have various shapes and be formed of various materials. The mid-IR reflector 16 can be reflective and/or transparent in the UV-VIS-NIR portion of the light spectrum. As such, the mid-IR reflector 16 may be more broadly understood to be a body having a surface 24 configured to reflect thermal energy radiated from surfaces of an object that are not directed toward the sky, such as the lower surface 18 of the pipe 12, and redirect such thermal energies skyward. The reflector 16 preferably exhibits high reflectivity (that is, high "reflectance") for wavelengths of 8 to 13 micrometers. However, the range need not be limited to 8-13 micrometers, and a larger range of high reflectance, for example in the range of about 5 micrometers to about 30 micrometers or more is foreseeable. For example, the annealed aluminum trough used for the present embodiment has high reflectance in a range of about 5 micrometers to about 30 micrometers.

Figure 2A:
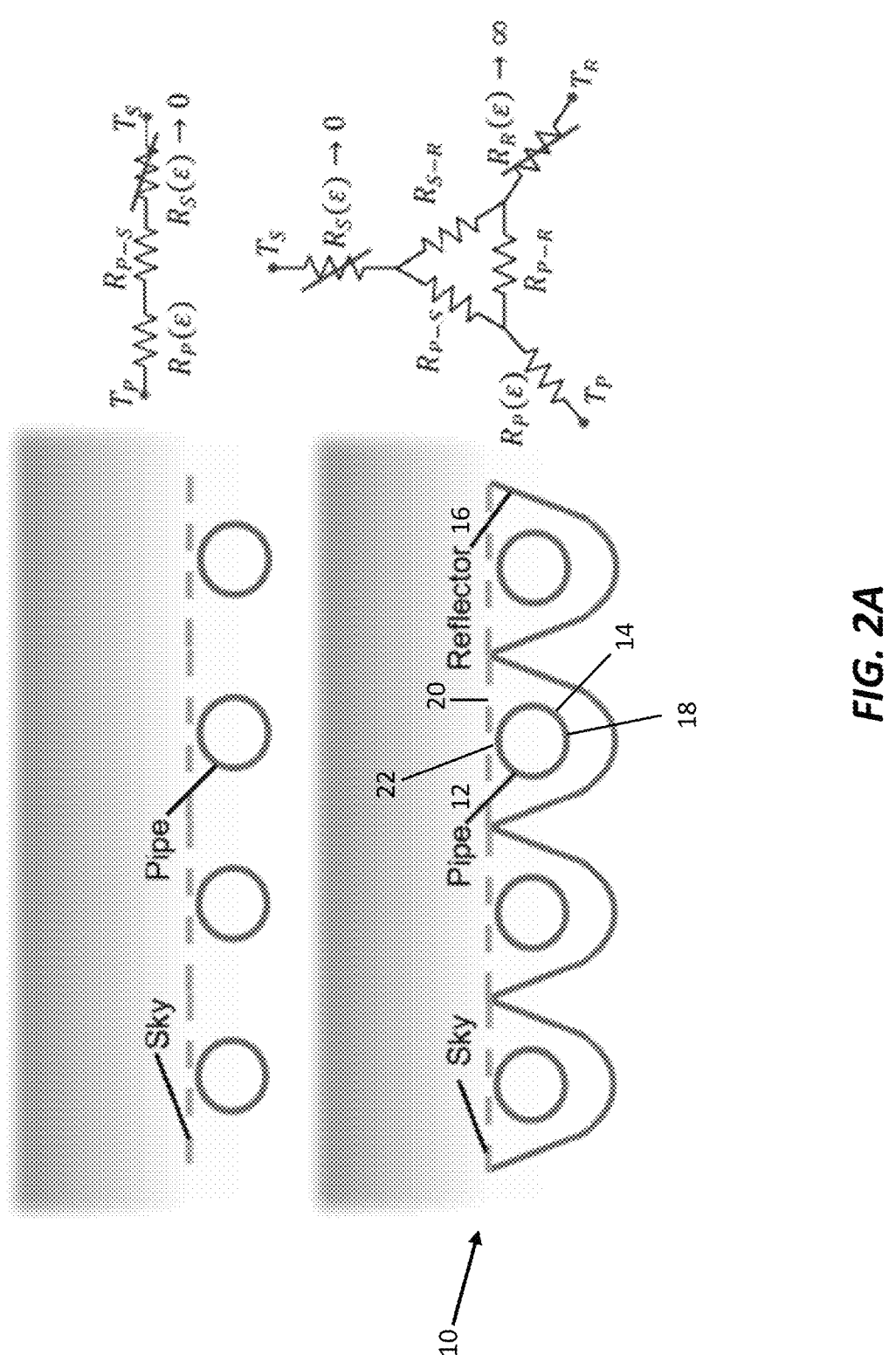
FIGS. 2A, 2B, and 2C represent a model of heat transfer of a CRC device of the type represented in FIGS. 1A and 1B.

The CRC device 10 may include pipe 12 formed to have various paths, one example being the serpentine path of the pipe represented in FIG. 1B, thereby allowing the CRC device 10 to be integrated into various types of cooling systems. The efficiency of such systems may be further promoted by nesting the pipe 12 inside the mid-IR reflector 16, as shown in FIGS. 1A and 1B. The reflector 16 is elongated and follows along the serpentine path of the elongated pipe 12. As represented in FIG. 2A, this nesting allows for an array of radiating pipes 12 that do not radiate to one another. Therefore, the CRC device 10 could be installed, for example, around high-rise buildings without loss of cooling power. Furthermore, the mid-IR reflector 16 acts as a convection shield to help mitigate parasitic thermal losses from the pipe 12 to the ambient air/wind. Another major benefit of this arrangement is ease of adaptation, as retrofitting it onto pre-existing systems could be accomplished with minor effort or modifications. The working fluid can flow directly through the coated pipes 12 negating any contact resistances or spreading resistances common to conventional cold plate designs.

Nonlimiting embodiments of the invention will now be described in reference to experimental investigations leading up to the invention.

The modeled performance of the concentrated radiative cooling system 10 was analyzed. The schematics of the pipes 12 without and with the mid-IR reflectors 16 are shown in FIG. 2A, along with the associated radiative transfer networks for two-surface and three-surface enclosures, respectively. For these calculations, the radiative cooling coating 14 on the surface of the pipe 12 was assumed to be a high concentration $BaSO_4$-acrylic paint having a composition similar to those disclosed in Ruan et al.; and the mid-IR reflector 16 was an annealed aluminum trough. The spectral properties of the radiative cooling coating 14 and the annealed aluminum mid-IR reflector 16 can be seen in FIG. 2B. The radiative cooling coating 14 had 96% total solar reflectance and the annealed aluminum had a reflectance of 95-99% in the sky-window. Though the annealed aluminum trough was highly reflective in the mid-IR, the ideal mid-IR reflector would be transparent in the solar spectrum; therefore, it would not reflect solar irradiation onto the lower surfaces ofthe pipe. Since the reflectance of the annealed aluminum was greater than 95% it was assumed to be a re-radiating surface in the mid-IR.

To quantify the utility of using a mid-IR reflector 16, this system 10 was treated as a three-surface enclosure with a re-radiating surface. The view factors of the pipe 12, illustrated in FIG. 2A, were calculated.

The sky-to-pipes view factor ($F_{s\text{-}ps}$) was calculated for an array of pipes with no reflector, as seen in the top image of FIG. 2A, using:

$$F_{s-ps} = 1 - \left[1 - \left(\frac{D}{s}\right)^2\right]^{1/2} + \frac{D}{s} \times \tan^{-1}\left(\frac{s^2 - D^2}{D^2}\right)^{1/2} \qquad (1)$$

where D was the pipe diameter, and s was the spacing between the centers of the pipe in the array. Using the reciprocity relationship, $A_i F_{i\text{-}j} = A_j F_{j\text{-}i}$, and approximating the area of the sky as 2s, the pipe-to-sky view factor $F_{p\text{-}s}$ was determined.

To find the view factors for the nested pipe 12 and mid-IR reflector 16 case, the system was treated as a three-surface enclosure, as noted above. The top surface represents the sky, as shown in the bottom case of FIG. 2A. The pipe-to-sky view factor $F_{p-s}$ was calculated using:

$$F_{s-p} = \frac{1}{\pi} \times \tan^{-1}\left(\frac{v}{h}\right) \qquad (2)$$

where v=W/(2R), W was the reflector opening 20, R was the radius of the pipe 12, and h was the distance between the pipe and the sky. From here all other view factors were determined.

Figures 2B, 2C:
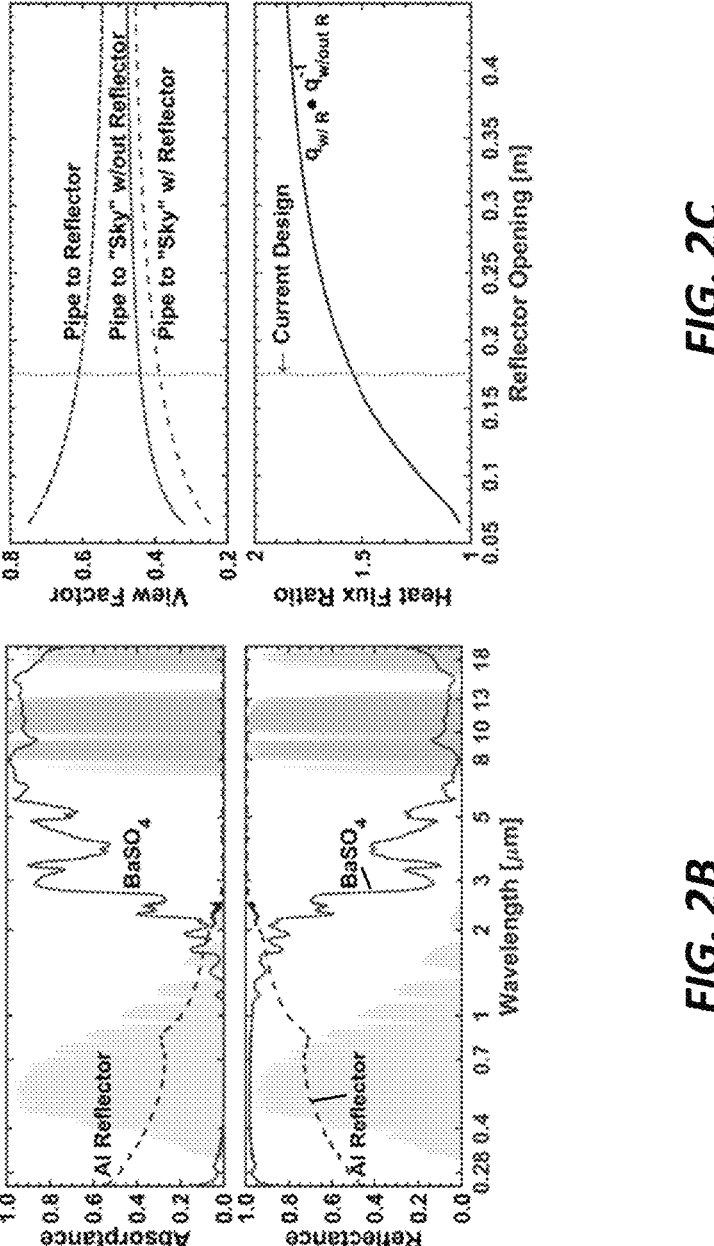

The view factors are represented in FIG. 2C as a function of the reflector opening width (pipe spacing s in eq. 1). Due to the pipe 12 being nested in the reflector 16, the pipe-to-reflector view factor ($F_{p-r}$) will always be greater than 0.5. Since the exterior of the pipe 12 cannot interact with itself, the pipe-to-sky view factor was 1-$F_{p-r}$. Without the mid-IR reflector 16, the theoretically ideal case would be the pipe-to-sky view factor always being less than 0.5, as the pipe 12 would be blocked by its neighbors, as shown in FIG. 2A. With the knowledge of the view factors both with and without the mid-IR reflector 16, the heat flux from each scenario was calculated. An effective way to visualize the benefit of the mid-IR reflector 16 was to show a ratio of the heat fluxes with and without the mid-IR reflector 16 while conserving the pipe spacing. In FIG. 2C, the ratio of the heat fluxes of the pipe with the mid-IR reflector and without the reflector is represented as a function of the mid-IR reflector opening width. As the opening 20 gets larger, the ratio approached two because twice the amount of surface area would radiate to deep space.

Figure 3A:
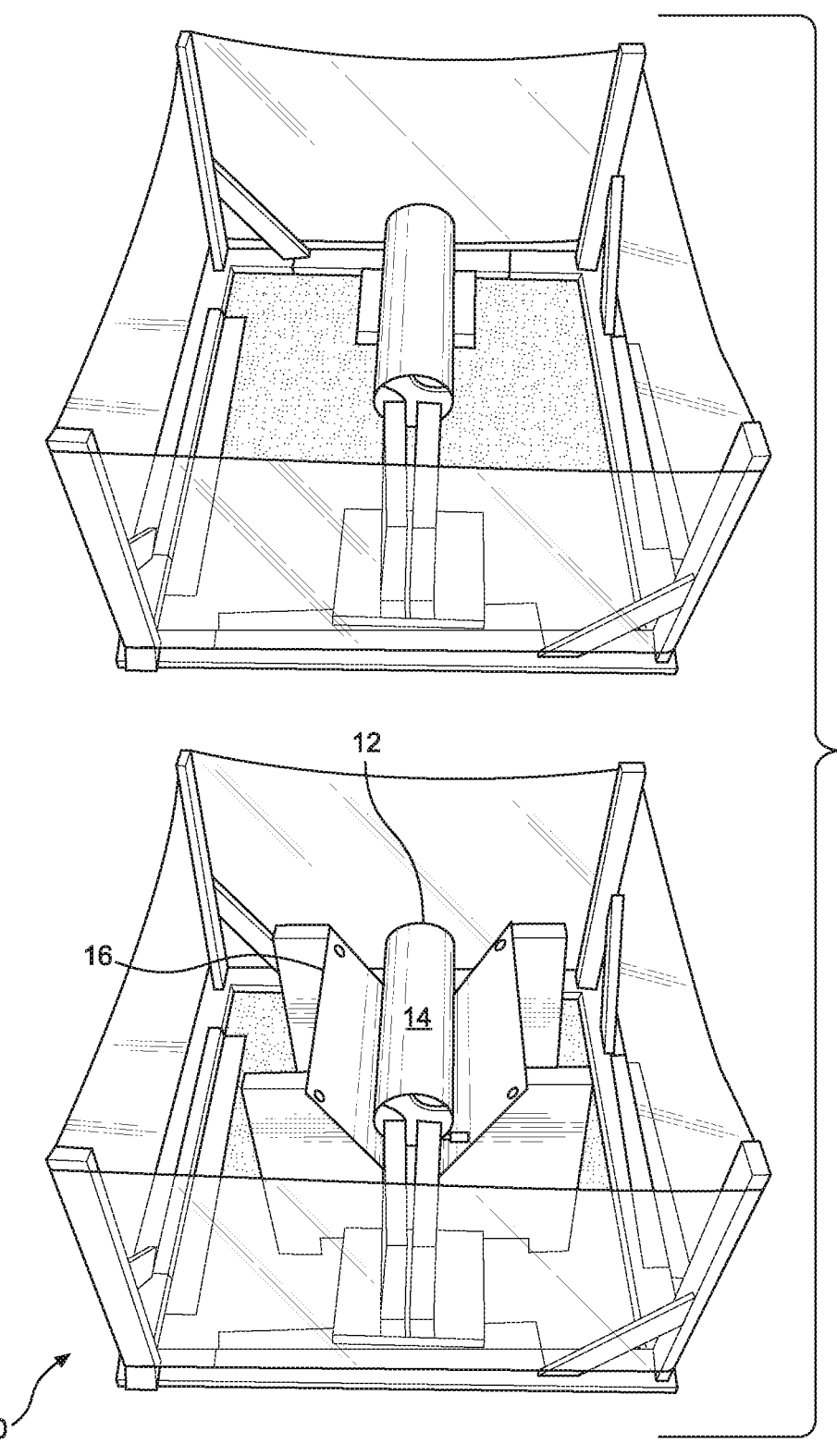
FIGS. 3A, 3B, and 3C represent an experimental field test of a CRC system during investigations that lead to nonlimiting aspects of the present invention.

FIG. 3A shows two test devices that were fabricated to demonstrate the concentration radiated thermal energy for an object having exterior surfaces configured to be exposed to sunlight. The devices each included a copper pipe (6.35 cm in diameter and 20 cm in length) coated with a radiative cooling coating. As represented, one of the devices (the top image) only included a coated pipe that acted as a control and the other device 10 (the lower image) included a reflector 16 with an opening 17.5 cm wide. Both setups were surrounded by a convection shield to negate wind effects, and the top surface of each pipe was exposed to sunlight and facing skyward. The temperatures of interior surfaces of the pipe wall and the ambient temperatures inside and outside the convection shield were monitored using type-K thermocouples.

Figures 3B, 3C:
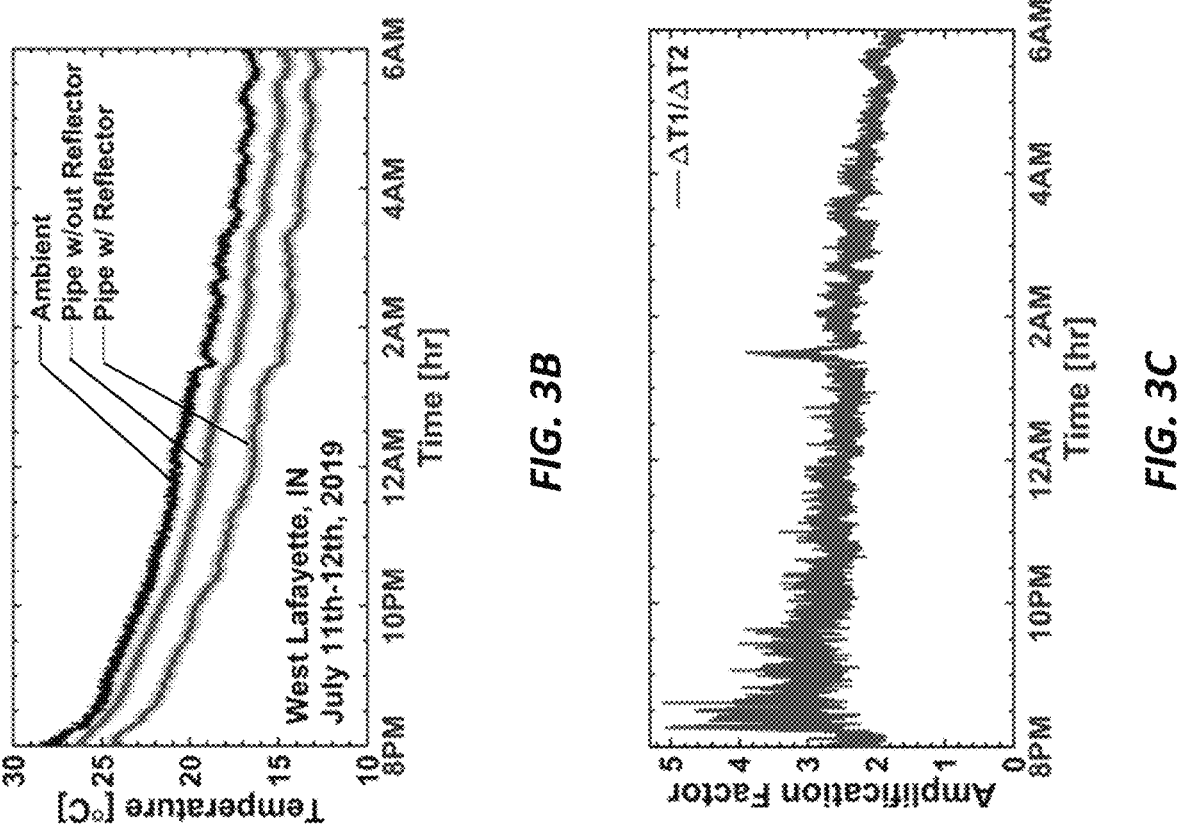

The temperature of the coated pipes, in parallel, were monitored to provide experimental verification that the CRC device 10 radiated with more surface area than a standalone pipe. In FIG. 3B, the pipe wall temperature of the CRC device 10 was significantly lower than that of the standalone pipe; which corroborates the concentration effect.

Both temperature profiles show below-ambient cooling; however, the temperature drop of the coated pipe 12 with the mid-IR reflector 16 was approximately twice that of the standalone coated pipe. The shaded areas in FIG. 3B represent ±0.5° C. error bars of the measurement. FIG. 3C represents the cooling power amplification factor, which was defined as the ratio of the below ambient temperature differences. The amplification factor was greater than that predicted by the three-surface enclosure model, possibly due to the testing location (West Lafayette, Indiana, USA); the view factor of the standalone pipe to deep space was decreased due to nearby high-rise buildings and tall trees, while the pipe 12 nested inside the mid-IR reflector 16 was not hindered by its surroundings. This further illustrated the benefits of the nesting of the pipe 12 inside the mid-IR reflector 16, as many real-world applications will likely not have a perfectly clear line-of-sight of the sky.

Figure 4A:
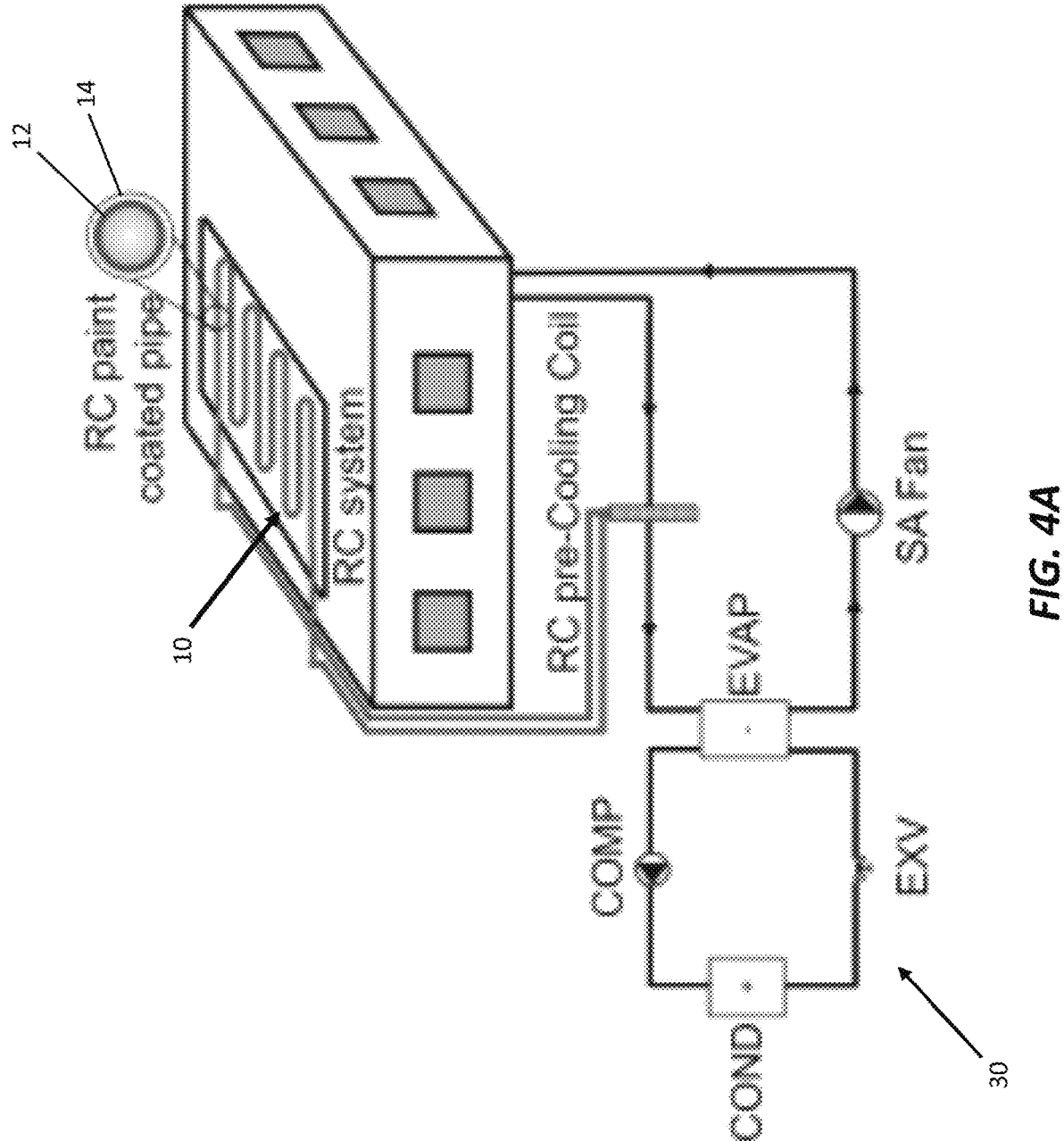
FIGS. 4A, 4B, 4C, and 4D represent a model of predicted energy savings with a CRC system for cooling a building.

To articulate the utility of the CRC device 10, a building energy model was developed and employed to predict the theoretical performance enhancement, in terms of electricity energy savings from operating a conventional air conditioning (AC) system 30. For this work, the CRC device 10 was implemented as a preconditioning heat exchanger for the return air in the HVAC system, as seen in FIG. 4A. The preconditioning heat exchanger has exterior surfaces that may be exposed to sunlight. Here, the air conditioning system 30 incorporating the CRC device 10 is implemented to cool an environment including the interior of a building. The preconditioning heat exchanger, hereafter referred to as the CRC system, comprised a water loop that flows through the CRC device 10 where thermal energy is rejected through radiant heat transfer to deep space. The chilled water was then used in a heat exchanger to pre-cool the return air prior to being cooled by the air conditioner. For comparison, the seasonal energy model simulations were also performed with the standalone pipe without the reflector, a system hereinafter referred to as the RC system. A temperature sensor was placed after the pre-cooling coil of the CRC system connected to the thermostat of the traditional AC system. The set-point of the sensor was 25° C. The AC system was turned on if the temperature of the air which travels through the heat exchanger was higher than the set-point and AC system was turned off if the temperature drops below the set-point. In this fashion, the CRC system was allowed to carry as much of the space cooling load as possible, and anything that remained was handled by the traditional air-conditioning system.

The building model was constructed based on the small commercial reference building published by the U.S. Department of Energy (DOE). The weather data utilized in the simulation was the typical meteorological year data of Reno, NV and Phoenix, AZ, respectively. The simulation time ran from May 2nd to September 31st to study the performance of the system during the summer season. The roof area of the building was 600 m$^2$. The roof coverage area of the CRC system varied, ranging from 0% to 100% in 10% increments.

Figure 4B:
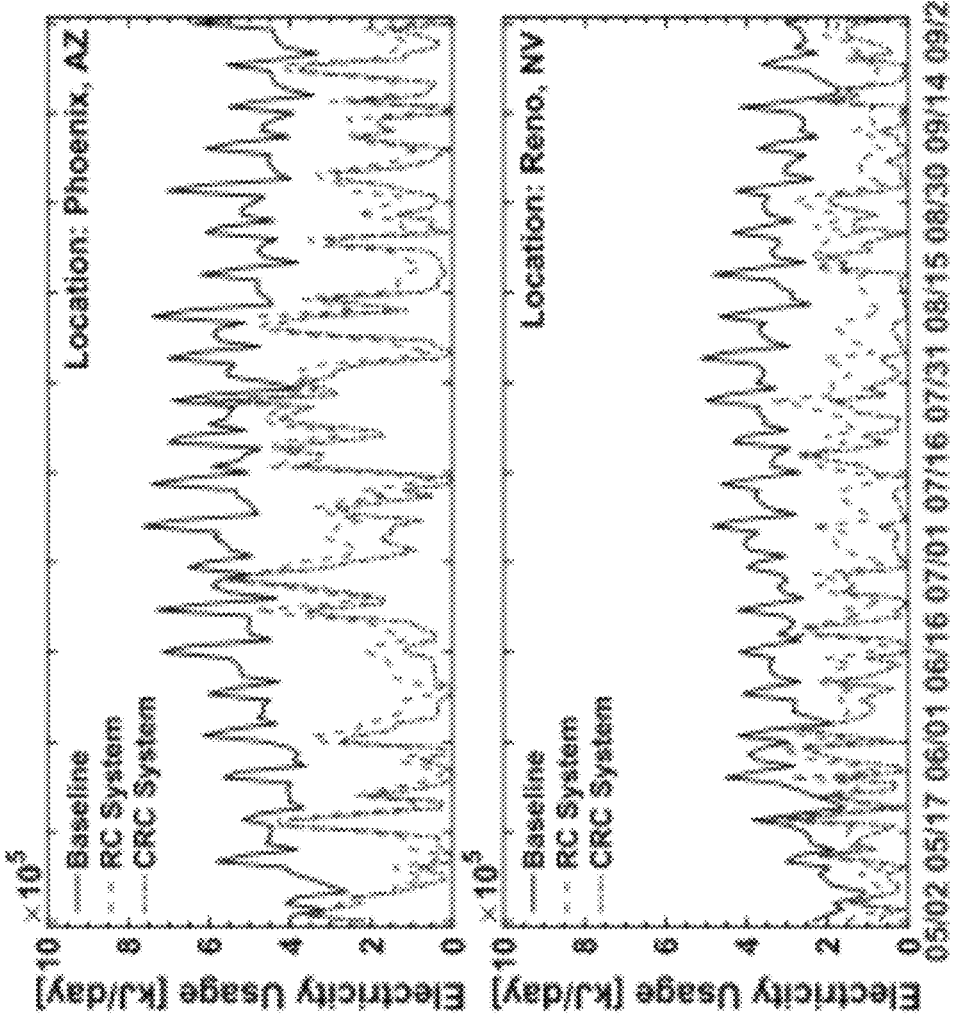

The energy consumption reduction of the air conditioner 30 had a nonlinear relationship with roof coverage of the CRC system. In FIG. 4B, the electricity usage from the AC system of the control case (black solid line), the RC system (red dashed line), and the CRC system (blue dotted line) are represented. Reno does not have an extremely high cooling demand throughout a typical cooling season, so both radiative cooling scenarios show potential benefits. However, Phoenix is much hotter, and has a greater amount of active cooling hours for the data; therefore, the CRC system showed greater benefits than the RC system. In Reno, the CRC system supplied more cooling capacity than was required within the building, based on the set-point temperature, i.e., the return air temperature after the CRC system was much lower than the required set-point. This led to excess or wasted cooling capacity, and ideally this cooling energy could be utilized more effectively for other subsystems throughout the building or stored for use when the heating demand increases or when the sky-window is obscured by heavy cloud coverage. Phoenix has much higher cooling loads so there is a more effective utilization of the cooling capacity supplied by the CRC system.

Figures 4C, 4D:
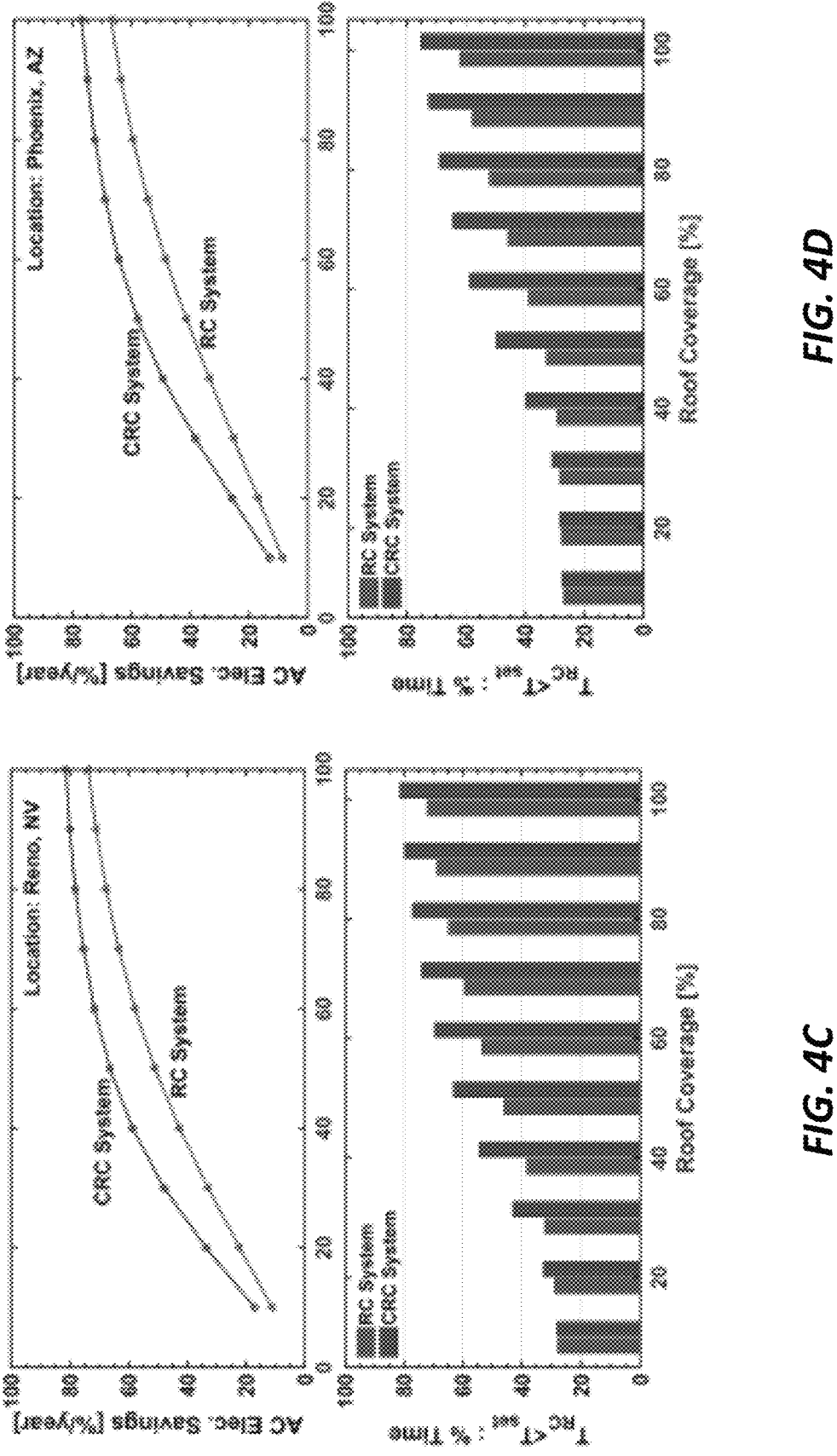

The energy consumption of the air conditioner was directly related to the hours it needed to operate to meet the load that was not covered by the CRC system. FIGS. 4C and 4D represent that the accumulated hours when the return air temperature after the CRC system was lower than the required set-point (hence the air conditioner was off) for Reno, NV and Phoenix, AZ, respectively. The trend of the energy saving plots was similar to the trend of the accumulative off hours, found in FIGS. 4C and 4D. Thus, the major energy savings came from the reduction of the air conditioner operating hours. As represented, the CRC system saved greater than 75% of the air conditioner energy consumption at 100% roof coverage for both locations.

The investigations reported above evidenced the concept of concentrated radiative cooling. Using a mid-IR reflector 16, heat transfer through radiation was enabled from the lower surfaces 18 of an object to deep space. The nested pipe configuration was also determined to block adjacent radiating surfaces from exchanging with one-another and provide some convective shielding. The outdoor experiments represented that the mid-IR reflector 16 did indeed reflect the thermal radiation from the lower surfaces 18 to deep space, quantifiable by the temperature drop of the two pipes in the test devices. Lastly, the building energy models represented a theoretical electricity savings of greater than 80% in Reno, NV and greater than 75% in Phoenix, AZ that can be obtained by incorporating the CRC system into a conventional HVAC system for a single-story commercial building at 100% roof coverage.

It should be appreciated that the CRC system described in the building model above is only a nonlimiting example of a CRC device 10 integrated into a cooling system. CRC devices 10 may be implemented broadly into various systems both within the air-conditioning sector as well as others.

As another nonlimiting example, CRC devices 10 may be utilized to assist in cooling power electronics in, for example, data centers. A cooling system for cooling the electronics may include a CRC device 10 according to the principles enunciated herein to receive thermal energy that originates as waste heat generated by information technology (IT) equipment. Currently, more than 50% of the electricity utilized in data centers is used by the information technology (IT) equipment (for example, computers, wiring, servers, printers, etc.) and around 40% by the cooling system. The total data center electricity consumption was reported as about 2.0 to 2.5% of the electricity used worldwide in 2019 and it is expected to be around 8.0 to 9.0% in the next decade. Currently, about 3 kW of the total power within a server's power consumption is generated as waste heat, which has been dramatically increasing due to an increase of high-power electronic components. Thus, novel thermal management strategies, such as systems comprising CRC devices 10, have the potential to create a next generation of sustainable and energy-efficient data centers.

A CRC device 10 in accordance with the present teachings may be used to easily modify a cooling system, such as the air conditioner system 30, that includes an object having exterior surfaces configured to be exposed to sunlight. For example, a radiative cooling coating 14 as described herein can be applied on the exterior surfaces of the object, and a mid-IR reflector 16 as described herein can be installed adjacent the object such that a surface of the reflector reflects at least some of the thermal energy radiated from the exterior surfaces and redirects the thermal energy skyward toward deep space. Non-limiting examples of such cooling systems include an air conditioning system for cooling an interior of a building and system configured to cool waste heat generated by information technology (IT) equipment as described previously herein.

Furthermore, the concept of utilizing the bottom surface(s) 18 of an object as a radiative cooler is not limited to pipe-trough designs such as those described herein. For instance, in certain embodiments a planar solar cell may be cooled on the back side by coating the back side with a radiative cooling coating 14 and then using a mid-IR reflector 16 to transfer the thermal energy to deep space. In addition, a CRC device 10 of the present disclosure may be used to modify a solar panel system having one or more planar solar cells, each solar cell having a first, or front, side directed skyward toward deep space to be exposed to sunlight and a second, or back, side not directed toward deep space. For example, a radiative cooling coating 14 as described herein can be applied on the back side of the solar cell(s) (e.g., a lower side not facing skyward toward the sun), and a mid-IR reflector 16 as described herein can be installed adjacent the solar cell(s) such that a surface 24 of the reflector 16 reflects at least some of the thermal energy radiated from the radiative cooling coating 14 on the lower side and redirects the thermal energy skyward toward deep space.

An object to be cooled as describe herein is not limited to a pipe with a fluid or a solar cell, but could include other items as well, such as one or more solid objects. It is expected that the teachings disclosed herein may be used in many areas to further increase utilization of passive radiative cooling. This approach is believed to substantially enhance radiative cooling performance while lessening the barrier to commercialization.

As previously noted above, though the foregoing detailed description describes certain aspects of one or more particular embodiments of the invention and investigations associated with the invention, alternatives could be adopted by one skilled in the art. For example, the CRC device and its components and the CRC system and its components could differ in appearance and construction from the embodiments described herein and represented in the figures, functions of certain components of the CRC device could be performed by components of different construction but capable of a similar though not necessarily equivalent) function, and appropriate materials could be substituted for those noted. As such, and again as was previously noted, it should be understood that the invention is not necessarily limited to any embodiment described herein or represented in the figures.

The invention claimed is:

1. An air conditioning system comprising:
   an air conditioner;
   a pre-cooling coil comprising a heat exchanger operatively connected to the air conditioner to supply pre-cooled return air to the air conditioner; and
   a preconditioning heat exchanger operatively connected to the pre-cooling coil to supply chilled water to the heat exchanger of the pre-cooling coil to pre-cool the return air,
   wherein the preconditioning heat exchanger comprises a water loop that flows through a concentrated radiative cooling device, the concentrated radiative cooling device comprising:
      a pipe forming a portion of the water loop to be cooled, the pipe having exterior surfaces configured to be exposed to sunlight from first directions;
      a radiative cooling coating on the exterior surfaces of the pipe, the radiative cooling coating configured to lose thermal energy from the pipe, the radiative cooling coating comprising a solar-reflective infrared-emissive paint that contains nanoparticles, is free of a polymeric matrix, and does not contain a metallic component, the radiative cooling coating exhibiting high emissivity for wavelengths of 8 to 13 micrometers and high reflectance for the solar spectrum wavelengths of 0.3 to 3 micrometers, wherein the radiative cooling coating is configured to radiate the thermal energy from a first of the exterior surfaces in the first directions and a second of the exterior surfaces in second directions that are different from the first directions; and an elongated reflector having a concave cross-sectional V-shape with an opening opposite a rounded valley of the concave cross-sectional V-shape, wherein the pipe is nested within the opening and the opening is not covered, wherein the concave-cross-sectional V-shape defines a surface configured to reflect the thermal energy radiated from the radiative cooling coating on the second of the exterior surfaces and redirect the thermal energy in the first directions, and wherein the elongated reflector has a high reflectance for wavelengths of 5 to 30 micrometers; and a temperature sensor configured to sense temperature of the pre-cooled return air from the heat exchanger of the pre-cooling coil, wherein the air conditioner is configured to turn on if the temperature of the pre-cooled return air is higher than a set point and to turn off if the temperature of the pre-cooled return air is lower than the set point.

2. The air conditioning system of claim 1, wherein the elongated reflector has a high reflectance for wavelengths of 8 to 13 micrometers.

3. The air conditioning system of claim 1, wherein the elongated reflector is formed of aluminum.

4. The air conditioning system of claim 1, wherein the pipe has a serpentine path and the elongated reflector follows along the serpentine path of the pipe.

5. The air conditioning system of claim 4, wherein the pipe is nested within the cross-sectional V-shape of the elongated reflector along the serpentine path to block adjacent radiating surfaces of the pipe from exchanging with one-another and provide convective shielding.

6. A cooling system comprising the air conditioning system of claim 1, the cooling system comprising:

an environment;

wherein the air conditioning system is configured to receive thermal energy from the environment to cool the environment or surface.

7. The cooling system of claim 6, wherein the environment is an interior of a building.

8. The cooling system of claim 6, wherein the thermal energy received by the air conditioning system from the environment or surface originates as waste heat generated by information technology (IT) equipment.

9. The device of claim 1, wherein the nanoparticles are $BaSO_4$.

10. A method of using the device of claim 1, the method comprising:

orienting the pipe such that the first of the exterior surfaces faces skyward toward deep space and the second of the exterior surfaces faces away from deep space; and using the elongated reflector to reflect and redirect the thermal energy radiated from the second of the exterior surfaces skyward toward deep space.

* * * * *